United States Patent [19]

Nihoshi

[11] Patent Number: 4,512,640

[45] Date of Patent: Apr. 23, 1985

[54] POLARIZING MICROSCOPE

[75] Inventor: Toshiaki Nihoshi, Tokyo, Japan

[73] Assignee: Nippon Kogaku K.K., Tokyo, Japan

[21] Appl. No.: 496,402

[22] Filed: May 20, 1983

[30] Foreign Application Priority Data

Jun. 4, 1982 [JP] Japan ................................ 57-95793

[51] Int. Cl.³ ..................... G02B 21/00; G02B 15/10; G02B 27/00
[52] U.S. Cl. ..................... 350/510; 350/520; 350/558; 350/572
[58] Field of Search ............... 350/507–511, 350/520, 524, 526, 558, 561–562, 572

[56] References Cited

U.S. PATENT DOCUMENTS

| 1,498,159 | 6/1924 | Ehringhaus | 350/524 |
| 1,527,848 | 2/1925 | Ehringhaus | 350/510 |
| 3,535,015 | 10/1970 | Yevick et al. | 350/520 |
| 3,572,885 | 3/1971 | Reinheimer et al. | 350/524 |

FOREIGN PATENT DOCUMENTS

| 1029591 | 5/1958 | Fed. Rep. of Germany | 350/520 |
| 2428807 | 1/1975 | Fed. Rep. of Germany | 350/510 |
| 1204784 | 9/1970 | United Kingdom | 350/510 |

OTHER PUBLICATIONS

Johns, F. L., "A Double-Field Finder & Guide Telescope", Sky & Telescope, 7-1971, pp. 42–44.

Watanabe et al., "Light-Figure Microscope Newly Designed & Its Crystallographic Application to Metal Specimens", Trans Jim Jap. Inst. Met (Japan), vol. 13#1, 1972, pp. 50–56.

Primary Examiner—William H. Punter
Attorney, Agent, or Firm—Shapiro and Shapiro

[57] ABSTRACT

A polarizing microscope comprises an orthoscopic system having an objective lens for forming the image of a sample, and a conoscopic system including polarizer means, analyzer means and an image forming lens disposed between the objective lens and the image plane of the image of the sample. The image forming lens is disposed at a position whereat the exit pupil of the objective lens and said image plane are conjugate with respect to the image forming lens and has a sufficiently small diameter relative to the width of the optical path of the orthoscopic system in said position. Thus, the conoscopic system forms the image of the exit pupil of the objective lens on the image plane and the observation light beam by the orthoscopic system passes through the outside of the image forming lens and forms the image of the sample around the image of the exit pupil on said image plane.

5 Claims, 5 Drawing Figures

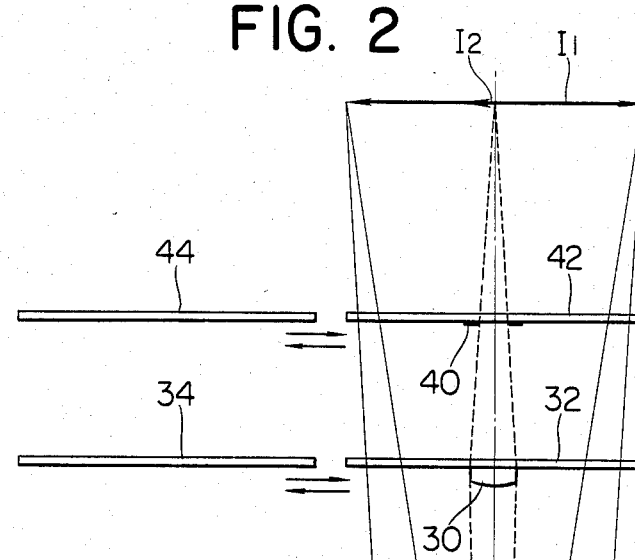
FIG. 2
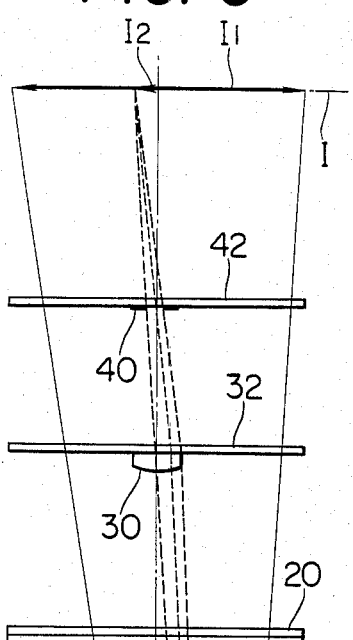
FIG. 5
FIG. 3
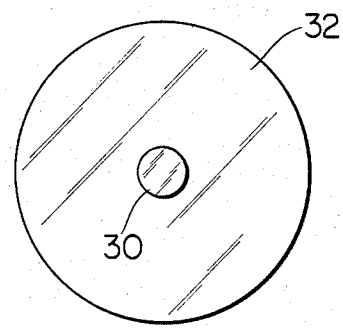
FIG. 4
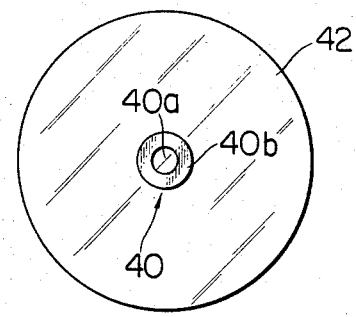

POLARIZING MICROSCOPE

BACKGROUND OF THE INVENTION

1. Field of the Invention

This invention relates to a polarizing microscope which permits orthoscopic observation and conoscopic observation to be effected, and in particular to a polarizing microscope which permits the both observations to be effected in the same field of view at a time.

2. Description of the Prior Art

A polarizing microscope generally comprises a so-called orthoscopic system in which the polarizer of a polarizing plate is disposed forwardly of a condenser and the analyzer of the polarizing plate is disposed on the optical axis between an objective lens and an eye-piece, and a so-called conoscopic system in which a Bertrand's lens (an image forming lens) is inserted between the objective lens on the optical axis and the eye-piece to cause the exit pupil (rearward focal plane) of the objective lens to be imaged on the forward focal plane of the eye-piece. Accordingly, both the orthoscopic observation in which the image of a sample formed by the objective lens is observed through the eye-piece and the conoscopic observation in which an interference image created on the exit pupil (rearward focal plane) of the objective lens is observed through the Bertrand's lens and the eye-piece are made possible by these two optical systems.

However, the conventional polarizing microscope is designed such that the orthoscopic observation and the conoscopic observation are effected independently of each other and therefore, in order that to what region of the sample the interference image observed by means of the conoscopic system belongs may be confirmed, it has been necessary to retract the Bertrand's lens from the optical axis and change over the observation to the orthoscopic observation, and further change over the condenser to one of narrow field of view if the illumination is of a wide field of view. Therefore, cumbersome operation has been required for conoscopically observe the interference images of many regions of the sample, and quick observation has been impossible.

SUMMARY OF THE INVENTION

It is an object of the present invention to provide a polarizing microscope in which an orthoscopic image and a conoscopic image are formed in the same observation field of view.

It is another object of the present invention to provide a polarizing microscope in which to what region of a sample the interference image in the conoscopic observation belongs can be confirmed quickly and very easily.

For these objects, in the present invention, a Bertrand's lens is made sufficiently small relative to the width of the optical path of the orthoscopic observation light beam and the orthoscopic observation light beam is designed to pass through the outside of the Bertrand's lens so that the polarizing images of a sample itself may be observed at a time around an interference image formed on the exit pupil of an objective lens. Preferably, to enable the interference image and the polarizing images around it to be clearly distinguished from each other, an annular stop provided with an opening for passing therethrough the emergent light beam from the Bertrand's lens is provided on the imaging plane of the image of the sample formed by the Bertrand's lens and the objective lens.

The invention will become more fully apparent from the following detailed description thereof taken in conjunction with the accompanying drawings.

BRIEF DESCRIPTION OF THE DRAWINGS

FIG. 2 shows the arrangement of the essential portions of the conoscopic system in the embodiment of FIG. 1.

FIG. 3 is a plan view of the Bertrand's lens of FIG. 2.

FIG. 4 is a plan view of the annular stop of FIG. 2.

FIG. 5 is an optical path diagram showing the imaging light beam in FIG. 2.

DESCRIPTION OF THE PREFERRED EMBODIMENTS

Figure 1:
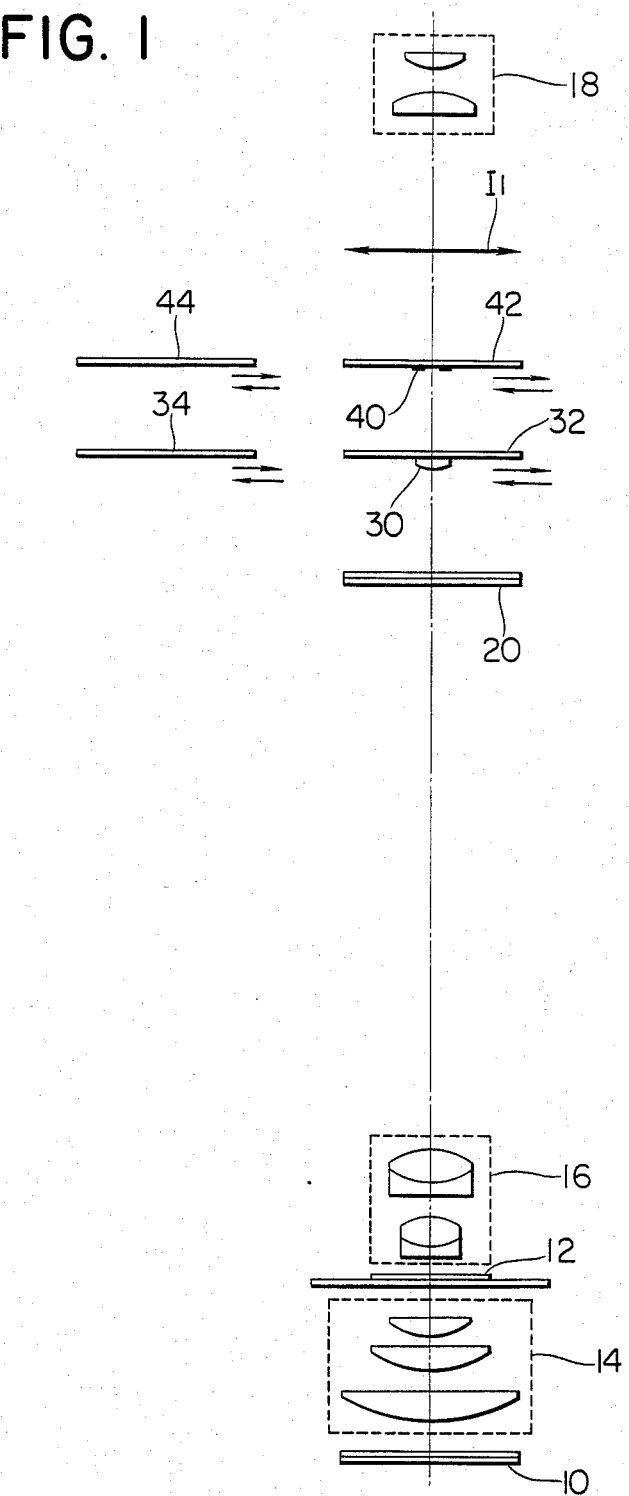
FIG. 1 shows the arrangement of the optical system of a polarizing microscope according to an embodiment of the present invention.

Referring to FIG. 1, a polarizer 10 is provided in a light beam from a light source condensed by a collector lens, not shown, and a sample 12 is illuminated by a light beam transmitted through the polarizer 10, through a condenser 14. An analyzer 20 is provided rearwardly of an objective lens 16, and the image $I_1$ of the sample 12 formed by the objective lens 16 through the analyzer 20 (hereinafter referred to as the "orthoscopic image") is formed on the forward focal plane of an eye-piece 18, namely, the image plane of the objective lens so that polarizing observation of the sample 12 itself (hereinafter referred to as the "orthoscopic observation") can be effected through the eye-piece 18. On the other hand, a parallel flat plate 32 supporting an imaging lens (hereinafter referred to as the "Bertrand's lens") 30 which will later be described in detail and a parallel flat plate 42 supporting an annular stop 40 are removably provided on the optical path between the analyzer 20 and the forward focal plane of the eye-piece 18, and design is made such that when the Bertrand's lens 30 and the annular stop 40 are retracted from the optical path, parallel flat plates 34 and 44 for compensating for the difference in the optical path thereof are inserted into the optical path.

FIG. 2 shows the arrangement of the Bertrand's lens 30, the annular stop 40 and the parallel flat plates 34, 44. The Bertrand's lens 30 and the annular stop 40, as shown in FIGS. 3 and 4, respectively, are provided centrally of the parallel flat plates 32 and 42, respectively. The Bertrand's lens 30 is disposed at a position whereat the exit pupil 22 (rearward focal plane) of the objective lens 16 and the image plane of the orthoscopic image $I_1$ are conjugate with respect to the Bertrand's lens 30. Accordingly, an interference image $I_2$ formed on the exit pupil 22 of the objective lens and further re-imaged by the Bertrand's lens 30 (hereinafter referred to as the "conoscopic image") is formed on a plane coincident with the orthoscopic image plane. The annular stop 40 provided rearwardly of the Bertrand's lens 30 comprises a central pin-hole opening portion 40a and an annular opaque portion 40b, as shown in FIG. 4, and is placed at a position substantially conjugate with the sample 12 with respect to a lens system comprising the objective lens 16 and the Bertrand's lens 30, that is, on the imaging plane of the sample 12 formed through the objective lens 16 and the Bertrand's lens 30. The outside diameters of the parallel flat plates 32 and 42 on which the Bertrand's lens 30 and the annular stop 40 are provided are sufficiently large relative to an orthoscopic observation optical path which passes through the outside of the Bertrand's lens 30 and the annular stop 40.

FIG. 5 shows the route of the light emergent from a point in the exit pupil 22 when the sample is illuminated by a parallel light beam. Of the emergent light beams, the light beam forming the orthoscopic image $I_1$ extends over the whole of the image plane I. On the other hand, the light beam forming the conoscopic image $I_2$, as indicated by broken line, passes through the Bertrand's lens 30, is converged on a plane coincident with the image plane of the orthoscopic image $I_1$ and passes through the pin-hole opening portion 40a of the annular stop 40 in the meantime. Since the annular stop 40 and the image plane of the orthoscopic image $I_1$ are at positions conjugate with the sample 12, the size of the region on the sample on which the conoscopic image $I_2$ is formed can be determined by forming the diameter of the pin-hole opening portion 40a to a suitable size. Also, the annular opaque portion 40b is formed to a suitable width so that the orthoscopic image $I_1$ formed by the light beam emitted from a point on the sample and converged from the whole plane of the exit pupil 22 of the objective lens onto a point on the image plane I and the aforementioned conoscopic image $I_2$ are partitioned and part of the light beam of the orthoscopic image $I_1$ does not overlap with the conoscopic image $I_2$ to make the conoscopic image difficult to see.

The Bertrand's lens 30 and the annular stop 40 may be constructed such that they can be removably inserted into the optical path independently of each other, or may be constructed such that they can be removably inserted into the optical path at a time. Alternatively, the two parallel flat plates 34 and 44 may be replaced by a single parallel flat plate of such a width that can compensate for the difference in optical path caused by the parallel flat plates 32 and 42 being retracted from the optical path. It is also desirable that the Bertrand's lens 30 be constructed so that its position can be changed in the direction of the optical axis thereof in accordance with the difference in the pupil plane of the objective lens 16 when the position of the exit pupil 22 of the objective lens 16 is changed relative to the forward focal plane of the eye-piece 18 by the objective lens 16 being interchanged. When only the Bertrand's lens 30 is inserted into the optical path and the annular stop 40 is retracted from the optical path, the marginal portion of the conoscopic image $I_2$ overlap with a part of the orthoscopic image $I_1$ and the region on the sample on which the conoscopic image $I_2$ is created becomes wide to thereby make it slightly difficult to confirm the range of that region. However, the light beam passing through the Bertrand's lens 30 is not stopped down by the small pin-hole opening portion and therefore, a bright conoscopic image can be obtained.

I claim:

1. A polarizing microscope comprising:
   (a) an orthoscopic system having an objective lens for forming the image of a sample; and
   (b) a conoscopic system including polarizer means, analyzer means and an image forming lens disposed between said objective lens and the image plane of the image of said sample, said image forming lens being disposed at a position whereat the exit pupil of said objective lens and said image plane are conjugate with respect to said image forming lens and having a sufficiently small diameter relative to the width of the optical path of said orthoscopic system in said position;
   whereby said conoscopic system forms the image of the exit pupil of said objective lens on said image plane and the observation light beam by said orthoscopic system passes through the outside of said image forming lens and forms the image of said sample around the image of said exit pupil on said image plane.

2. A polarizing microscope according to claim 1, further comprising annular stop means disposed on the imaging plane of the image of said sample formed by a light beam passed through said objective lens and said image forming lens and provided with an opening for passing therethrough the light beam emergent from said image forming lens.

3. A polarizing microscope according to claim 2, further comprising first and second transparent parallel flat plates for holding said image forming lens and said stop means, respectively, said first and second parallel flat plates having a sufficiently large diameter relative to the width of the optical path of said orthoscopic system in the respective positions thereof.

4. A polarizing microscope according to claim 3, wherein each of said first and second parallel flat plates is provided so that it is retractable from the optical path of said orthoscopic system with said image forming lens and said stop means, and said polarizing microscope further comprises a transparent optical member inserted in said optical path to compensate for any difference in optical path caused by retraction of said first and second parallel flat plates.

5. A polarizing microscope according to claim 1, wherein said image forming lens is disposed at such a position that the optical axis thereof is coincident with the optical axis of said objective lens.

* * * * *